Figure 6:
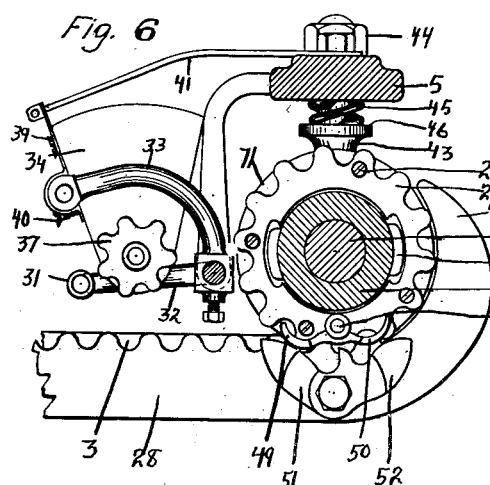

D. J. JENNINGS.
MACHINE FOR THE MANUFACTURE OF PAPER RECEPTACLES.
APPLICATION FILED JAN. 24, 1914.
1,107,956.
Patented Aug. 18, 1914.
5 SHEETS—SHEET 1.
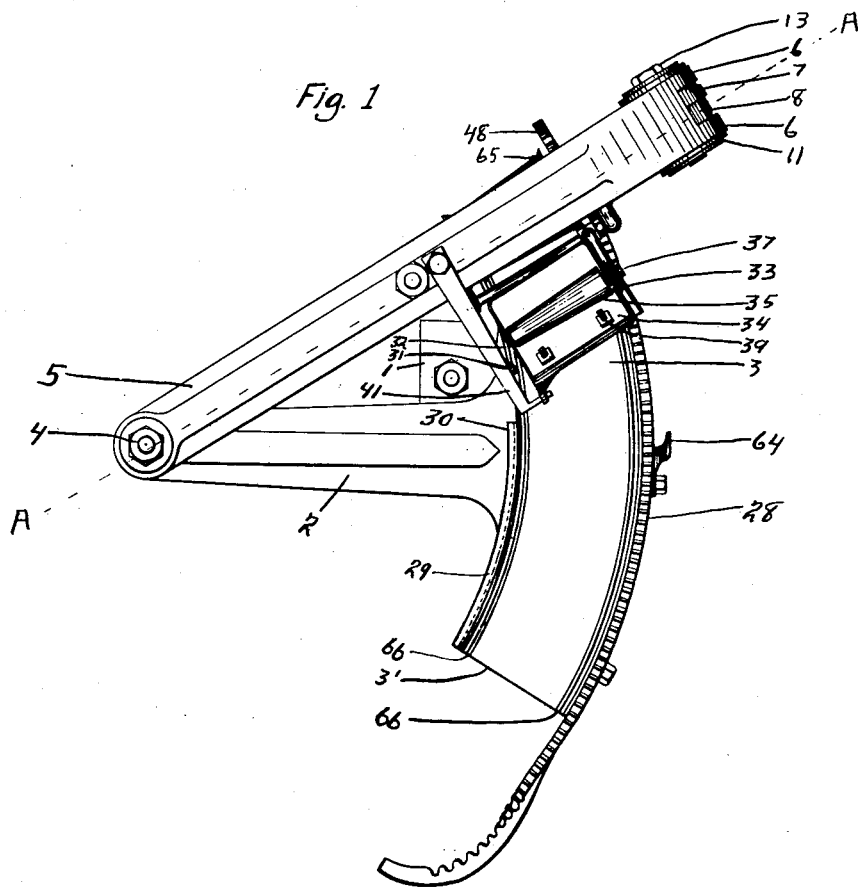
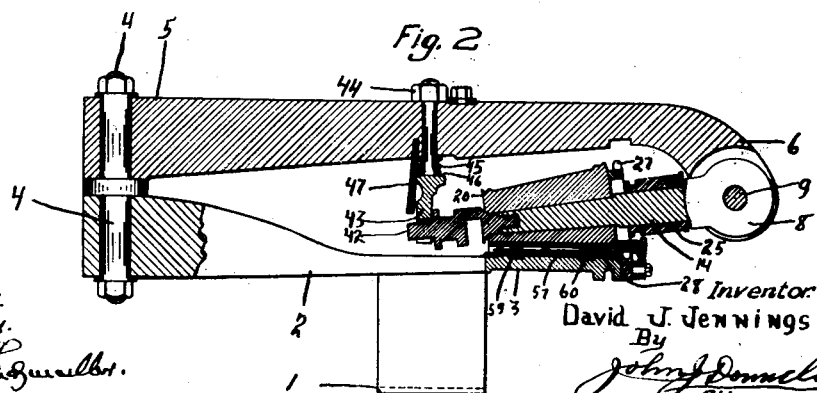
Witnesses.
Inventor:
David J. Jennings
By
Attorney D. J. JENNINGS.
MACHINE FOR THE MANUFACTURE OF PAPER RECEPTACLES.
APPLICATION FILED JAN. 24, 1914.
1,107,956.
Patented Aug. 18, 1914.
5 SHEETS—SHEET 2.
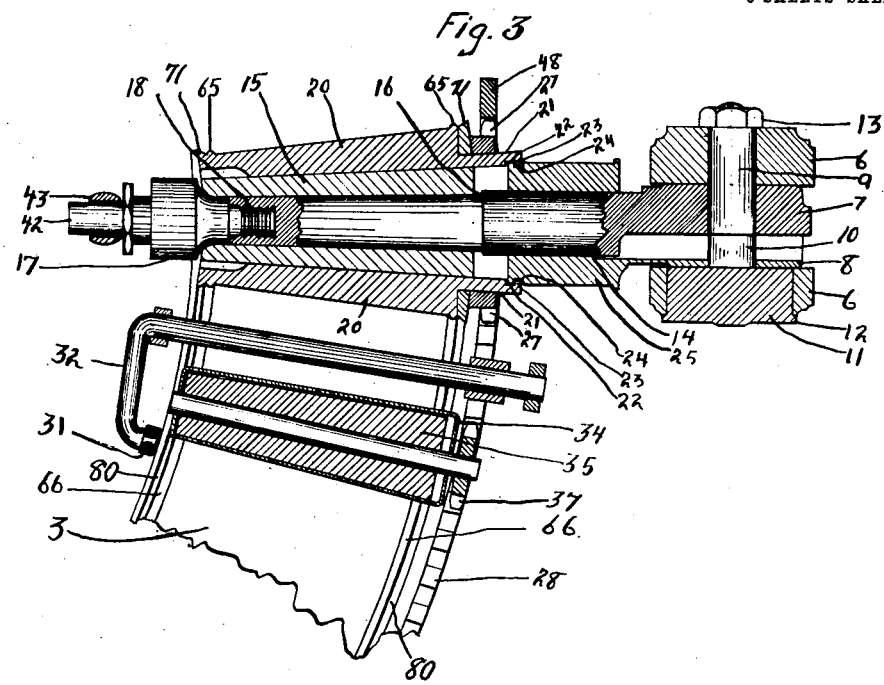
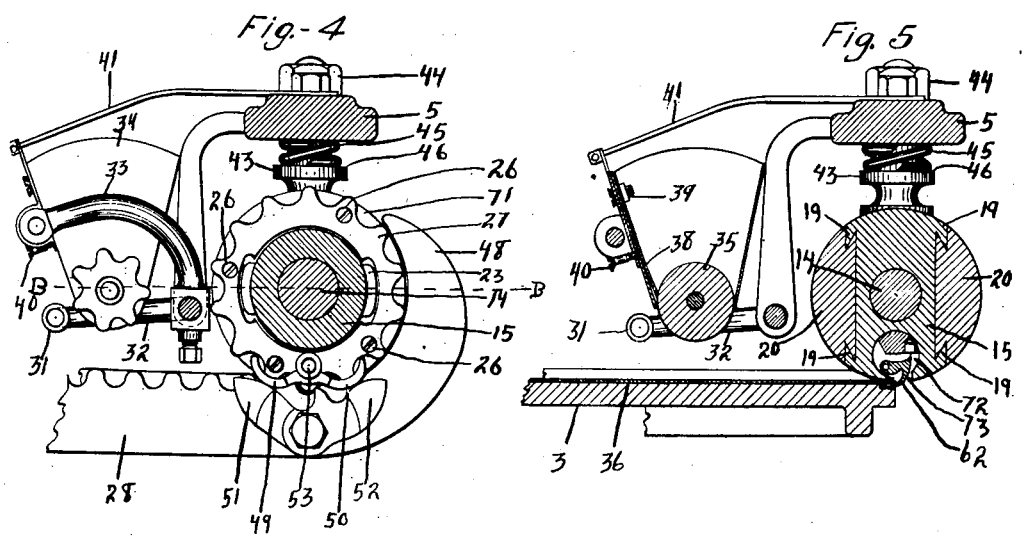
Witnesses
Inventor:
David J. Jennings
By *John J. Donnelly*
Attorney.

D. J. JENNINGS.
MACHINE FOR THE MANUFACTURE OF PAPER RECEPTACLES.
APPLICATION FILED JAN. 24, 1914.

1,107,956.

Patented Aug. 18, 1914.

5 SHEETS—SHEET 3.

Witnesses

Inventor
David J. Jennings
By John J Donnelly
Attorney

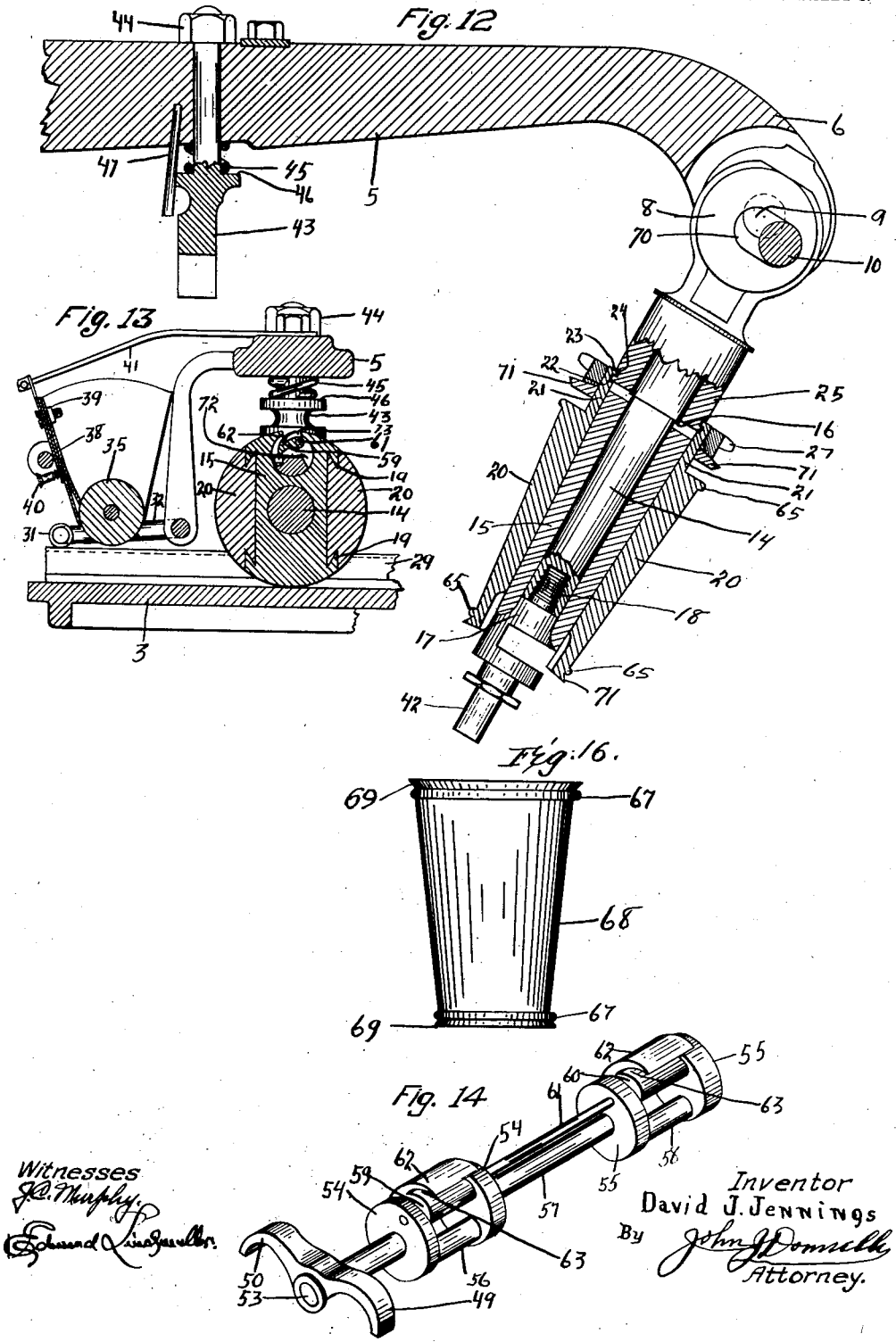

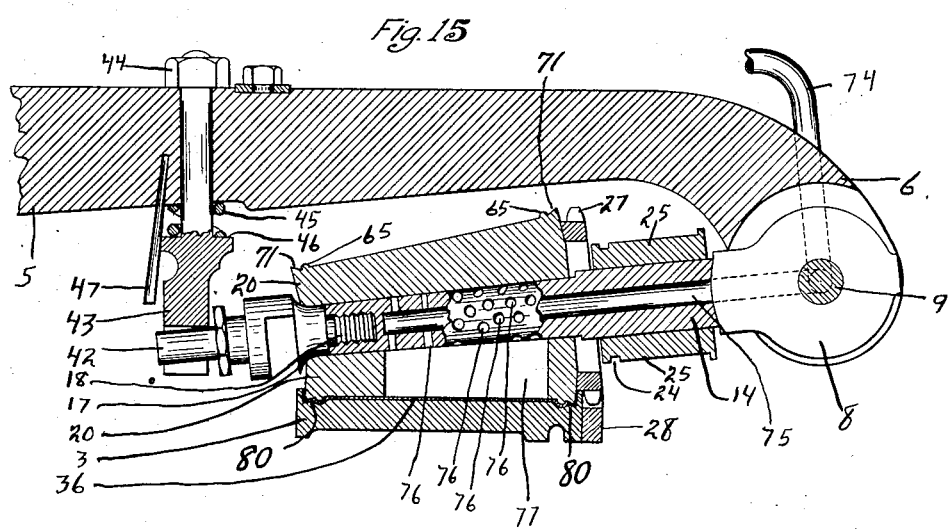

UNITED STATES PATENT OFFICE.

DAVID J. JENNINGS, OF CLEVELAND, OHIO.

MACHINE FOR THE MANUFACTURE OF PAPER RECEPTACLES.

1,107,956.  Specification of Letters Patent.  Patented Aug. 18, 1914.

Application filed January 24, 1914. Serial No. 814,180.

*To all whom it may concern:*

Be it known that I, DAVID J. JENNINGS, a citizen of the United States, residing at Cleveland, in the county of Cuyahoga and State of Ohio, have invented certain new and useful Improvements in Machines for the Manufacture of Paper Receptacles; and I do hereby declare the following to be a full, clear, and exact description of the invention, such as will enable others skilled in the art to which it pertains to make and use the same.

This invention relates to machines for the manufacture of paper receptacles and has special reference to that type of machine which will make the paper receptacle embodied in my United States Letters Patent Number 890,985, dated June 16, 1908.

The object of this invention is to produce a machine which will roll up, paste, and deliver a paper receptacle automatically. In order to accomplish this object I provide in this machine a horizontally located mandrel, (preferably tapered) provided with suitable dogs for engaging one of the free ends of the blank piece of paper. The blank paper being positioned on a die plate in the path of travel of the mandrel will be picked up by the dogs of the mandrel and rolled up into a tubular member, a pasting mechanism is also provided which supplies the blank paper with sufficient paste to secure the paper in the shape into which it has been formed by the machine. After the paper is properly rolled and pasted the mandrel drops off of the die plate and, by means of cam mechanisms suitably located, contracts hence allowing the paper thus formed to drop off of the mandrel. As far as this machine is concerned the receptacle is completed when the paper tube, properly pasted and rolled drops off of the mandrel; the top and bottom of the receptacle being placed in position any time desired.

Another object of this invention is to so design this machine that with slight mechanical detailed changes a series of these machines may be embodied into one machine which will produce a large number of receptacles at one time.

Other objects will appear and be more fully set forth and claimed in the following specifications and claims.

Figure 7:
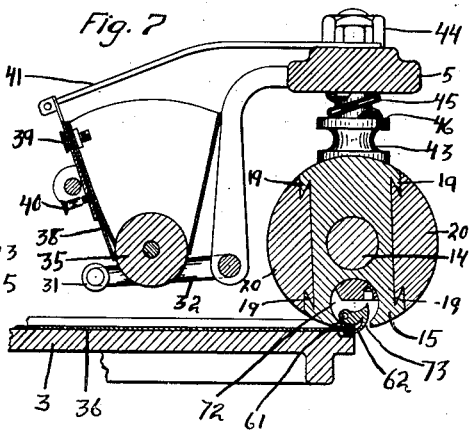
Figure 8:
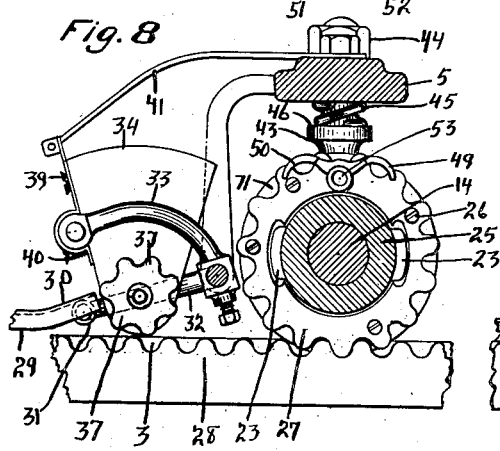
Figure 9:
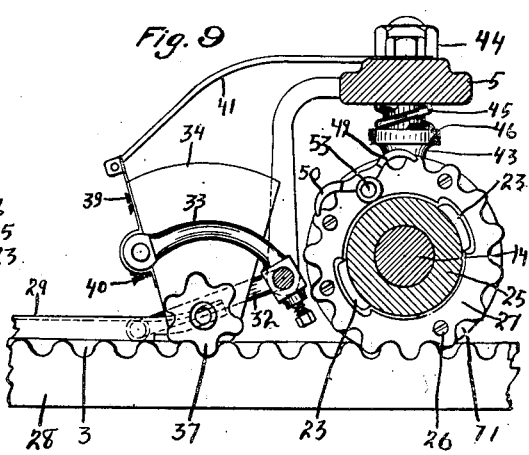
Figure 10:
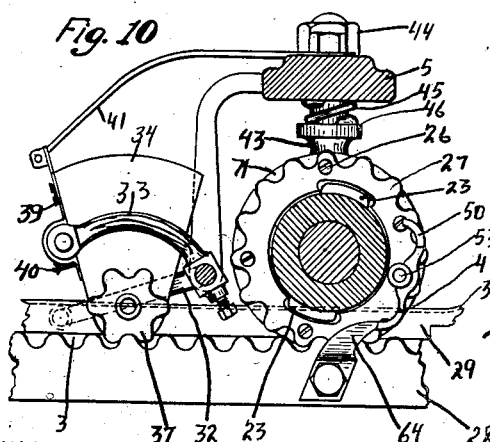
Figure 11:
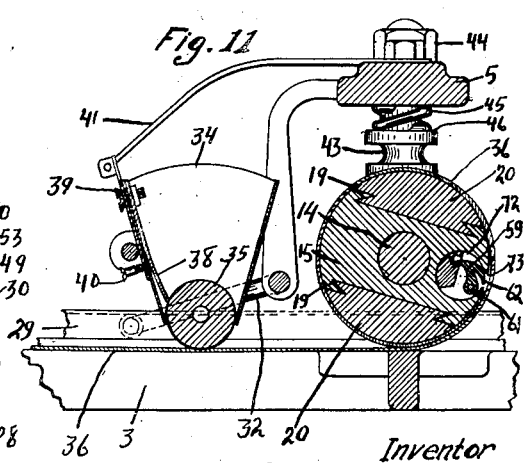

In the drawings, Figure 1, is a top plan view of my invention showing the position of the several parts. Fig. 2, is a sectional view taken through lines A—A of Fig. 1, and shows the location of the several parts before the insertion of the paper blank. Fig. 3, is a sectional view taken through lines B.—B. of Fig. 4. This view shows the relative position of the mandrel and the pasting mechanism. Fig. 4, is an end view of the mandrel with the cam mechanism and outer end of the supporting arm removed for the purpose of clearness. In this view the machine is ready to receive the blank paper. Fig. 5, is a sectional view of the mandrel and the pasting mechanism shown in Fig. 4. Fig. 6, is a view similar to Fig. 4 but shows the mandrel slightly advanced. Fig. 7, is a sectional view showing the relative position of the parts when in the position shown in Fig. 6. This view illustrates the paper blank when it is gripped and ready to be rolled on the mandrel. Fig. 8, is an end view showing the position of the mandrel after it has traveled one half a revolution. In this view the pasting mechanism is shown just coming into action. Fig. 9, is a view similar to Fig. 8 and shows the mandrel slightly further advanced and illustrates the pasting mechanism in action. Fig. 10, illustrates the mandrel after it has made one and one eighth revolution and shows the manner of releasing the paper tube from the dog. Fig. 11, is a sectional view showing the relative position of the parts when the paper is released from the dogs. This view also shows the pasting mechanism operating in advance of the mandrel. Fig. 12, is a sectional view taken through the arm and mandrel showing the manner of positioning and contracting the mandrel in order to drop the paper tube from the mandrel after it has been rolled and pasted. Fig. 13, is a sectional view similar to Fig. 11 and shows the position of the pasting mechanism when the mandrel is returned to the starting position. Fig. 14 is an isometric view of the dogs and their mounting used for the gripping of the paper to the mandrel, and Fig. 15, is a modification taken in cross section showing the employment of a vacuum construction which may be found preferable to the dogs for holding the paper blank to the mandrel during the first one and one quarter revolutions of the mandrel. Fig. 16 is a view showing the finished article produced by this machine.

1 represents a standard to which is secured the brace support 2. At one end of the brace support 2 I attach a table or die plate 3 and at the opposite end of said brace support I provide the pivot 4 upon which swings the arm 5. On the outer end of the arm 5 a depending portion 6 is provided in which are pivotally mounted the sections 7 and 8 of the mandrel. In mounting these sections 7 and 8 to the end of the arm 5 I employ a pivot provided with a centrally located portion 9 and an eccentric portion 10. (See Fig. 12.) The eccentric portion 10 of the pivot is secured to the head 11 which is provided with a flange 12. This head 11 and flange 12 are mounted in the end 6 of the arm 5. The centrally located portion 9 of the pivot is provided with a screw thread and is held in place by the nut 13. By tightening this nut 13 the pivot is held firmly and without danger of rotating. The section 7 is pivotally mounted on the portion 9 of the pivot thus having an even downwardly swinging movement when the mandrel passes beyond the end 3' of the die plate 3. The section 7 extends inwardly forming a bearing 14. Upon the bearing 14 is mounted the main portion 15 of the mandrel. This portion 15 is held on the bearing 14 between the shoulder 16 and the nut 17, said nut being tapered and screw threaded into the bearing as at 18. This portion 15 is provided with dove-tailed members 19, 19, 19, 19, (see Fig. 5) into which are slidably mounted the portions 20, 20, which in combination with the portion 15 form the complete mandrel. The outer ends of the portions 20, 20, are each provided with tongues 21, 21, in which are provided recesses 22, 22, thus forming lips 23, 23, which in turn engage in the recess 24 of the cylindrical member 25. The member 25 is slidably mounted on the outer end of the bearing 14 and is formed integral with the section 8. The section 8 is provided with an elongated orifice 70 (see Fig. 12) through which passes the eccentric portion 10 of the pivot. To the flange 71 of portion 15, by means of screws 26, is mounted the gear wheel 27 which engages with the teeth of the rack 28 on the die plate 3. When the arm 5 is passed from one side to the other, the gear wheel 27 passing over the teeth of the rack 28 causes the mandrel to revolve and ride over the die plate 3. On the inner edge of the die plate 3 I have provided a track 29 which extends approximately half the distance of the die plate 3, starting with an incline 30 (see Fig. 8) and terminating at the far end of the die plate 3. The under surface of this rack 29 engages the roller 31 of the rod 32 which in turn is secured to the arm 33 carrying the paste can 34. When the roller 31 is engaged by the under surface of the track 29 the paste can 34 is brought downward until the roller 35 touches the paper blank 36 (see Fig. 11) and at the same time the gear wheel 37 engages the rack 28 in advance of the gear wheel 27, thus the paste roller 35 is revolved and carries with it a predetermined amount of paste or other adhesive material which is contained in the paste can 34. In order to control the amount of paste to be supplied to the paper blank 36 I have provided a gage plate 38 in the form of a sheet of metal which is secured to the inner surface of the paste can 34 as at 39. A set screw 40 is secured to the casing of the paste can 34 and by screwing the set screw inwardly the gage plate 38 is pressed against the roller 35 thus limiting the supply of paste. After the arm 5 has been swung to the end 3' of the plate 3 the roller 31 is released from the track 29 thus allowing the spring 41 to bring the paste can 34 and its co-acting parts upward and out of engagement with the die plate 3 and when the arm 5 is swung back to the beginning point the roller 31 travels on the upper surface of the track 29 (see Fig. 13) thus preventing the die plate 3 from being covered with paste. At the end of the nut 17 (see Fig. 3) I provide a lug 42 which engages the fork 43. The fork 43 is slidably mounted in the arm 5 and is secured in place by means of the nut 44. Between the shoulder 46 of the fork 43 and the under surface of the arm 5 I provide a spring 45 which acts as a cushion when the mandrel is rolling the paper and also keeps the mandrel firmly upon the paper blank 36. In order to prevent the fork 43 from revolving I place a pin wedge 47 in the under surface of the arm 5 and cause the pin wedge 47 to come in contact with a notch in said fork 43.

Having so far described the main portions of this machine I will now describe the working of the machine and the parts relating to the movement and operations: The machine is positioned as shown in Fig. 1 and a paper blank 36 is placed on the die plate 3, this paper blank being long enough to cover the upper surface of said die plate 3. By referring to Fig. 2, it will be seen that the mandrel is touching the die plate 3 and is ready to receive the paper blank 36. In Fig. 3, the machine is shown in the same position as in Figs. 1 and 2. Fig. 4 shows the end view of the machine and illustrates the hook 48 which prevents the mandrel from being brought too far or out of position. When the mandrel is in the position as shown in Fig. 4 the arms 49 and 50 rest firmly on the lugs 51 and 52 respectively. The arms 49 and 50 are securely attached to the rod 53 which in turn is mounted to the plates 54 54 and plates 55 55; these plates being connected to each other by rods 56, 57 and 58 (see Fig. 14). Pivotally mounted between the plates 54, 54 and 55, 55, are dogs 59 and 60 respectively; these dogs being attached to rods 61 which causes the dogs 59 and 60 to act in unison, the rod 61 being pivotally mounted in the plates 54, 54, 55, 55. Each of the dogs 59 and 60 is provided with lips 62 which form wedge shaped recesses 63. The paper blank 36 being placed in position, one edge of said blank 36 is inserted under the mandrel in the wedge shaped recesses 63 of the dogs 59 and 60. (See Fig. 5.) Then when the mandrel is slightly advanced the arm 49 travels upward on the lug 51 thus causing the lower ends of the dogs 59 and 60 to travel forward hence wedging the blank 36 between the lip 62 and the outer surface of the portion 15 of the mandrel. (See Figs. 6 and 7.) The plates 54, 54, 55, 55, acting as bearings in the orifice 72 and the lips 62 extending through the opening 73 of the portion 15 of the mandrel form the gripping device above set forth. The arm 5 is carried on thus advancing the mandrel; the gear wheel 27 traveling over the teeth of the rack 28 causing the mandrel to be revolved during its travel over the die plate 3 thus the blank 36 is carried on the mandrel and takes the form of a tapered cylinder (see Fig. 12). When the mandrel has made approximately one half of a revolution the roller 31 engages the incline 30 of the track 29 (see Fig. 8,) thus bringing the paste can 34 and the paste roller 35 downward so that the roller 35 comes into contact with the paper in advance of the mandrel. At the same time, the paste can 34 and the paste roller 35 is brought downward the gear wheel 37 engages the rack 28 thus causing the roller 35 to revolve in the paste can 34 and bring a predetermined amount of paste into contact with the blank 36. (See Fig. 9.) When the mandrel has traveled so as to make more than one full revolution the arm 49 comes into contact with the lug 64 thus releasing the dogs 59 and 60 from the blank paper 36. (See Figs. 10 and 11.) The mandrel is still carried forward rolling the blank 36 until the mandrel and the rolled blank 36 reach the end 3' of the die plate 3. It will be seen by reference to the drawings that the mandrel is provided with beads 65 and tapered flanges 71 and that the plate 3 is provided with corresponding grooves 66 and depressions 80 thus embossing the beads 67 and tapering flanges 69 on the finished product 68 (see Fig. 16). The lower part of the finished product being provided with a tapering flange 69 will cause the finished product to be firmly held on the mandrel and it is for the purpose of releasing the finished product 68 from the mandrel that I construct the mandrel in the following manner: By attaching the members 20 to the section 8 as hereinabove set forth it will be seen that these members are controlled by the movement of the section 8 (see Figs. 3 and 12). After the mandrel has reached the edge 3' of the die plate 3 the rack 28 is so formed as to carry the mandrel gradually downward thus the section 7 being pivoted on a centrally located pivot allows the member 15 of the mandrel to swing downwardly on a perfect arc from the pivot portion 9 while at the same time the section 8 being mounted (as hereinabove set forth) on the eccentric pivot 10 causes the members 20 to be thrust downward beyond the member 15, thus it will be seen that the mandrel is contracted sufficient to allow the finished product 68 to drop from the beads 65 of the mandrel. On the reverse movement of the mandrel the members 15 and 20 reverse their action and when the mandrel is again on the die plate 3 the mandrel has assumed its normal contour. The dove tailed construction shown as at 19, 19, 19, 19, holds the members 15 and 20 in relative position to each other but allows them a sliding movement. In carrying the arm 5 with the mandrel back to the beginning point the teeth of the gear wheel 27 riding over the teeth of the rack 28 causes the mandrel to revolve and be in the correct position again to repeat the action of making another bottle, receptacle or paper tube. The arm 50 traveling over the lug 52 causes the dogs to be positively opened and ready to receive the blank paper 36 upon the insertion of the paper into the machine.

At times it may be found desirable to employ a vacuum mechanism for holding the blank 36 to the mandrel while the paper tube 68 is being formed and it is for this purpose that I have shown a modification of my invention in which I employ a suitable conduit 74 having connection with any desired mechanism for producing a vacuum or near vacuum. This conduit 74 leads through the end 6 of the arm 5 and then passes through the section 8 and into the bearing 14. The bearing 14 is formed with the hollow section 75 and from the hollow section 75 a series of orifices 76, 76, 76, 76, radiate and communicate with the elongated slot 77 of the section 20' of the mandrel. By constructing my mandrel in this manner I may do away with the dogs and their coacting parts.

It is apparent that other modifications of this invention may be made without departing from this invention hence though I have illustrated and described this invention in detail I do not wish to be limited to the exact details of construction.

Having thus described my invention, what I claim is new and wish to secure protection upon is:

1. A machine of the type set forth comprising a base, an arm pivotally mounted to said base, a bearing mounted to said arm, a mandrel revolubly mounted upon said bearing, a die plate upon which said mandrel travels, means located within said mandrel for grasping and holding one end of a sheet of paper, said mandrel adapted to be advanced and revolved over said die plate so as to form a tubular casing of a receptacle.

2. A machine of the type set forth comprising a base, an arm pivotally mounted to said base, a bearing mounted to said arm, a mandrel revolubly mounted upon said bearing, a die plate upon which said mandrel travels, means located within said mandrel for grasping and holding one end of a sheet of paper, said mandrel adapted to be advanced and revolved over said die plate to form a tubular member of the paper, means located and operating in advance of said mandrel for pasting said paper, all substantially as and for the purpose set forth.

3. A machine of the type set forth comprising a base, an arm mounted to said base, a bearing mounted to said arm, a mandrel revolubly mounted to said bearing, means located within said mandrel for grasping and securing a sheet of paper thereto, a die upon which said mandrel rolls said paper, said mandrel adapted to be advanced and revolved over said die and means for contracting said mandrel for releasing said rolled paper from said mandrel, all substantially as and for the purpose set forth.

4. A machine of the type set forth comprising a base, an arm pivotally mounted to said base, a mandrel revolubly mounted on said arm, means located within said mandrel for gripping and securing one end of a sheet of paper thereto, a die plate upon which is rolled said mandrel and said paper, means located in said die plate and said mandrel for embossing beads on said paper, means for pasting said paper so as to hold the paper in the shape into which it is formed in combination with means for automatically contracting said mandrel so as to release said paper therefrom.

5. A machine of the type set forth comprising a base, an arm pivotally attached to said base, a mandrel rotatably mounted on a bearing, said bearing pivotally attached to a concentric pivot in said arm, sections of said mandrel being dove-tailed together and having lateral movement with each other, all substantially as and for the purpose set forth.

6. A machine of the type set forth comprising a base, an arm pivotally mounted on said base, a mandrel rotatably mounted on a bearing, said bearing pivotally attached to a concentric pivot in said arm, the mandrel being composed of sections, the main section provided with dove tailed connections which connect slidably mounted sections thereto, connecting means attached to said slidably mounted sections, said connecting means revolubly mounted to a bushing surrounding said bearing, said bushing having pivotal attachment to an eccentric pivot in said arm for the purpose of giving a lateral movement to said slidably mounted sections of said mandrel, all substantially as and for the purpose set forth.

7. A machine of the type set forth comprising a mandrel for rolling a sheet of paper into a tubular form, a die plate upon which said mandrel travels, a pasting mechanism adapted to supply the paper with adhesive material, means located on said die plate for bringing into action said pasting mechanism in advance of said mandrel, all substantially as and for the purpose set forth.

8. A machine of the type set forth comprising a mandrel, means for rolling a sheet of paper upon said mandrel, means for pasting the surface of said paper so as to hold the paper in the shape into which it is formed by said machine, a die plate upon which said mandrel rolls the paper and means in said die plate and said mandrel for forming an annular bead in said paper and means for forming a flaring portion in said paper adjacent said bead, all substantially as and for the purpose set forth.

9. A machine of the type set forth comprising a mandrel, means for rolling a sheet of paper on said mandrel, means for pasting the surface of said paper so as to hold the paper in the shape into which it is formed by said machine, said mandrel provided with an annular bead and provided with a flaring portion adjacent said bead, in combination with means for supporting said sheet of paper against said mandrel, the surface of said supporting means corresponding with the surface of said mandrel for the purpose set forth.

Signed at Cleveland in the county of Cuyahoga and State of Ohio this 21st day of January 1914.

DAVID J. JENNINGS.

Witnesses:
ALBERT B. DONNELLY,
FRANK C. GREGG.